United States Patent

[11] 3,568,612

| [72] | Inventor | Kenneth W. Stookey<br>Markle, Ind. |
|---|---|---|
| [21] | Appl. No. | 800,684 |
| [22] | Filed | Feb. 19, 1969<br>Continuation-in-part of Ser. No. 719,300,<br>Mar. 25, 1968, Patent No. 3,511,194 |
| [45] | Patented | Mar. 9, 1971 |
| [73] | Assignee | Torrax Systems, Inc.<br>North Tonawanda, N.Y. |

[54] COMBUSTION CHAMBER
19 Claims, 3 Drawing Figs.

[52] U.S. Cl. .................................... 110/28,
110/8
[51] Int. Cl. .................................... F23b 5/04
[50] Field of Search .......................... 110/28, 23,
8, 171; 122/7; 431/5; 23/277

[56] References Cited
UNITED STATES PATENTS

| 2,344,347 | 3/1944 | Foresman | 110/171 |
| 2,957,436 | 10/1960 | Lotz | 110/28 |
| 3,200,047 | 8/1965 | Kurtz | 110/28 |
| 3,320,906 | 5/1967 | Domahidy | 110/8 |

*Primary Examiner*—Edward G. Favors
*Attorney*—Karl W. Brownell

ABSTRACT: Apparatus for the complete and controlled combustion of combustible materials, particularly gases and combustible distillates produced by incomplete combustion and distillation products of various classes of carbonaceous fuels, waste materials, and the like. The apparatus comprises a generally vertical chamber into which the material is introduced at the top and is admixed with air. The material moves downwardly during combustion thereof and the products of combustion which are gaseous are discharged from the side of the chamber near the bottom while solid products of combustion are withdrawn from the bottom of the chamber. There may, advantageously, be provided a vessel at the bottom of the chamber to receive the solid products of combustion and this vessel includes valves for controlling the passage of material therethrough so that the chamber can be operated at subatmospheric pressure. At the top, the chamber is always at subatmospheric pressure, and the material to be burned is drawn into the chamber by suction.

COMBUSTION CHAMBER

This is a continuation-in-part of ser. no. 719,300, filed on Mar. 25, 1968, now U.S. Patent No. 3,511,194.

BACKGROUND OF THE INVENTION

The present invention is evolved in connection with the disposal of waste material. In U.S. Pat. No. 3,511,194, there is shown a method and apparatus for disposing of waste materials in which the materials to be disposed of are charged into the top of a vertical primary gasification chamber which is supplied with a hot air blast at the bottom. The upwardly moving hot air blast, and which may be on the order of 2,000° Fahrenheit, results in substantial reduction of the waste material. The initial reaction occurs at such a high temperature that the inorganic content of the materials charged into the primary chamber will be converted to a neutral, molten mass which is greatly reduced in volume and which is simple to dispose of after it has been tapped from the vessel and has been reduced to ambient temperature.

The waste material charged into the primary chamber, which is not reduced to a slag in the primary chamber, is drawn off therefrom as a sort of producer gas distillates, vapors, etc., and is conveyed to a secondary chamber where it is caused to burn to a completely oxidized condition so as to eliminate toxic and noxious gases and odors.

The present invention is particularly concerned with the construction and arrangement of the secondary chamber. The products of combustion in the secondary chamber comprise a certain amount of solid material which is drawn from the bottom thereof, preferably into a sealed collecting vessel; and gaseous products of combustion which are advantageously conveyed through gas cooling means, such as a waste heat boiler and then through a gas cleaner before being discharged to the atmosphere.

The system generally described operates efficiently for disposing of the heterogeneous waste matter collected, particularly, in the urban areas where the volume of such waste material is a serious problem. By efficient reduction and combustion of the waste material, the problem of disposal thereof is greatly alleviated while, at the same time, toxic or noxious vapors and particulate are prevented from being discharged into the atmosphere as would be the case if incomplete combustion of the material occurred.

Still other instances will occur wherein a combustion process is being carried out, for example, the burning of solid carbonaceous fuels on a grate in which incomplete combustion takes place. The unburned gases from such as apparatus can be burned to completion in the combustion chamber according to the present invention.

It is the normal practice when burning solid fuels such as coal, trash, and the like to place the materials on a grate which may be either fixed or moving. The bed is ignited and drafted from beneath. The air serves to keep the grates cool and furnishes a large part of the air for combustion. Air entering under the fuel bed cannot completely burn the fuel in that when the fuel, or carbon, reaches 2,000° Fahrenheit to 2,000° Fahrenheit $CO_2$ cannot exist in the presence of more carbon and is converted to $2CO$ by picking up a second carbon atom with the absorption of heat. A part of the sensible heat produced by this partial combustion is further absorbed by devolatilization of the fuel. This produces gases and vapors that are also combustible and are added to the $CO$ already produced.

These must be burned over the bed since they constitute a major portion of the total fuel value charged. Therefore, a secondary air is introduced over the bed in order to supply oxygen for their combustion and release of heat.

This design of fire box constitutes the majority of commercial and industrial installations and is responsible for a great deal of the air pollution problems through the emission of unburned gases, hydrocarbon vapors (smoke) and finally divided solids. This can and does occur even though a high percentage of excess air is present. The reason for this is caused by stratification of the air and combustibles due to which the two do not meet before they are cooled below their ignition point by the cool boiler tubes or entry in to a cool stack.

In order to reduce this effect to a minimum, large combustion zone volumes must be designed into the system in order to increase the time and probabilities of the meeting of fuel and air. As a result the heat release per hour, per cubic foot of combustion volume will range from as low as 40,000 B.t.u. to no more than 80,000 B.t.u. Even large and available combustion volumes are not the whole answer for complete combustion as witnessed by an open coal or wood fire from which large volumes of smoke, vapors and unburned gases escape. Even a stream of raw natural gas burning in the open will emit quantities of visible, unburned carbon and invisible quantities of unburned gases. Again, this is due to poor contact between the gases and air before they have reached their ignition point.

Conversely, if gas and air are fully diffused or mixed with each other and then ignited, combustion is so rapid, it is known as an explosion. This is even true of finely divided combustible solids such as coal, dust, grain dust, etc., that have been known to explode in industrial plants with violent and disasterous results.

First, it must be understood that all combustion takes place from gas phase so solid or liquid materials must be converted to gases before their combustion can occur. This gasification step takes place with the absorption of heat and a consequent lowering of the flame temperature. This latter is of critical importance in relation to speed of combustion, i.e., the higher the mixture temperature of the fuel and air as they meet, the more rapid and complete is their combustion.

These points indicate it is necessary to get as complete a mixing of the combustion elements in the shortest possible time, and at the highest flame temperature in order to accelerate complete combustion of the gases, vapors and solids in the minimum combustion space. To illustrate this, a perfect mixture of air and gas released in a hot ceramic cup will burn at the rate of in excess of 4,000,000 B.t.u./hour/cubic foot as compared to 40,000/80,000 B.t.u./hour/cubic foot in a boiler fire box.

For the purpose of burning the combustible portion of the effluents from a bottom blasted, vertical shaft furnace such as is used in iron foundries, top charged waste product incinerators, etc., such high heat release figures cannot be attained but neither can the lower rates be tolerated.

The present invention thus proposes to design a combustion chamber and combustion system that will be operable and economical for the complete and controlled combustion of such effluents.

The type of furnace with which the chamber will be used is the open top, vertical furnace with forced bottom blast. The gases generated will be withdrawn at or near the top of the charge surface by a subatmospheric suction.

The withdrawal of the gases from the furnace are controlled to hold the surface of the burden at slightly under atmospheric pressure to preclude any escape of effluent to atmosphere. The fume from the furnace will pick up a small amount of air, but held below the lower explosive limit of the mixture if the below charge takeoff is used. If the above charge takeoff is used, enough air may be drawn in to put the mixture in the explosive range but still lacking enough for complete combustion. In this case, pilot lights provide ignition and preclude explosion. However, as pointed out, top burning, such as will take place in a bottom blasted vertical shaft furnace, will produce stratified, therefore, incomplete combustion. In each case, secondary air must be added into the mixture for complete combustion in a secondary combustion chamber.

With the foregoing in mind, it is an object of the present invention to provide an apparatus for the burning of gaseous material to a completely oxidized state.

It is still another object of the present invention to provide a combustion chamber which can serve as a secondary combustion region in connection with a waste material disposing apparatus.

Still another object of this invention is the provision of a combustion chamber in combination with a receiver for the solid products of combustion with a receiver for the solid products of combustion in which the chamber and receiver are so related that the removing of the solid products of combustion from the receiver does not interfere with the pressure being maintained in the combustion chamber.

Still another object of this invention is the provision of a combustion chamber of the nature referred to having inlet means for the material to be burned such that the burning of the material is augmented by the path of travel of the material in the chamber.

It is also an object to provide an arrangement for adding secondary air to the material to be burned in such a manner that the secondary air and the material are completely admixed before combustion of the material occurs.

Still another object of this invention is the provision for a combustion chamber in which the inlet for the material to be burned is at subatmospheric pressure so that the apparatus can be employed with primary combustion chambers, for example, which are open at the top for receiving waste material and the like.

Still another object of this invention is the provision of an apparatus for burning materials, such as incompletely oxidized products of combustion and the like, in which economic thermal operating conditions are maintained.

The foregoing objects as well as still other objects and advantages of the present invention will become more apparent upon reference to the following detailed specification, taken in connection with the accompanying drawings, in which:

FIG. 3 is a view showing a modified form which the combustion chamber according to the present invention can take.

Figure 1:
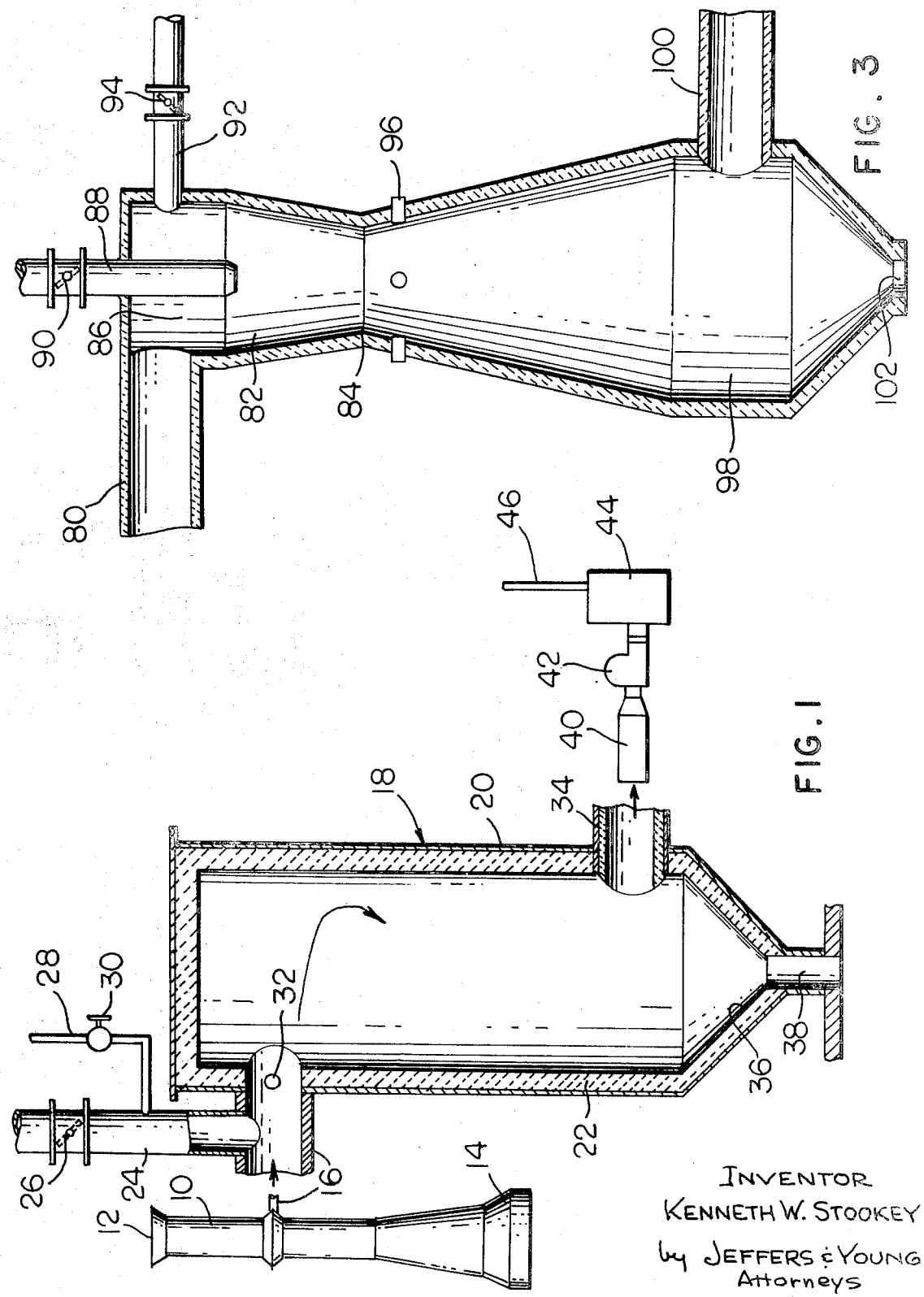
FIG. 1 is a schematic illustration of a waste disposal system incorporating a combustion chamber according to the present invention, with the combustion chamber shown at a larger scale than the remainder of the apparatus.

Referring to the drawings somewhat more in detail, FIG. 1 shows a primary combustion chamber 10 having an opening 12 at the top into which waste materials can be charged for movement downwardly through the chamber. At the bottom of primary chamber 10 is a hearth 14 to which air at elevated temperature, and under pressure, is supplied so that the air moves upwardly in chamber 10. The air supplied to hearth 14 is at a temperature of about 2,000° Fahrenheit and serves to cause combustion in chamber 10 so that temperatures as high as 4,000° Fahrenheit might be reached therein. A temperature of 4,000° will not only provide for considerable burning of the waste materials but will also melt metal, and glass, and other solid materials therein so that they can move downwardly to hearth 14 in the form of a molten slag. This molten slag is tapped from hearth 14 in a suitable manner, and upon cooling, can be crushed and disposed of in a simple manner.

The combustion chamber 10 which has combustion within is, however, incomplete and a combustible producers gas and vapors, etc. are produced therein. These are tapped from chamber 10 by conduit 16 which leads to the secondary combustion chamber of the present invention, and which is generally indicated at 18. Combustion chamber 18 comprises a cylindrical outer steel shell 20, round in cross section, and lined with refractory material 22 in any conventional manner. Conduit 16, as will be seen in FIG. 1, enters the upper end of combustion chamber 18 near the top and in a tangential direction so that the gaseous material from primary chamber 10 will swirl therein and tend to impinge against the refractory walls of the chamber. During operation, the walls of the chamber are hot and promote burning of the material.

A second conduit at 24 is connected with conduit 16 near the connection of the latter to chamber 18 and preferably enters conduit 16 in a tangential direction. Conduit 24 has a control valve 26 therein and is supplied with air under subatmospheric pressure so that any air needed for complete combustion of the material conveyed in conduit 16 can be added to the material and will be completely admixed therewith before the material enters chamber 18, and wherein the movement of the material in the chamber will still further promote the admixing of the material and the air.

Under certain circumstances, for maintaining the proper combustion conditions in chamber 18, it may be advisable to add fuel, such as natural gas or the like to the material, and for this purpose there is provided a fuel line 28 having a control valve therein and which may communicate with conduit 24.

In order to insure ignition of the material, there are preferably igniter means 32, which may be in the form of pilot lights and the like, in the path of the material after it is admixed with the secondary air from conduit 24.

The material burns in chamber 18 and moves downwardly therethrough and the gaseous products of combustion exit from the chamber by way of conduit 34, which may also be refractory lined. Any solid products of combustion drop to the conical bottom portion 36 of chamber 18 and exit therefrom through discharge opening 38 which communicates with the collection vessel shown more in detail in FIG. 2.

Conduit 34 may supply the hot gas leaving chamber 18 to a waste heat boiler 40 for the recovery of heat from the gas, with a suction fan 42 maintaining the flow of gas through the boiler 40. The gas from blower 42, preferably passes through a gas cleaner 44 and exits to the atmosphere via stack 46 in a clean and completely oxidized condition.

A feature to be noted is that suction blower 42 maintains conduit 16 under subatmospheric pressure so that the materials to be burned are drawn into chamber 18 and so that the connection of conduit 16 to primary chamber 10 is under suction, whereby primary chamber 10 can be operated with suction at its upper end open at all times.

Figure 2:
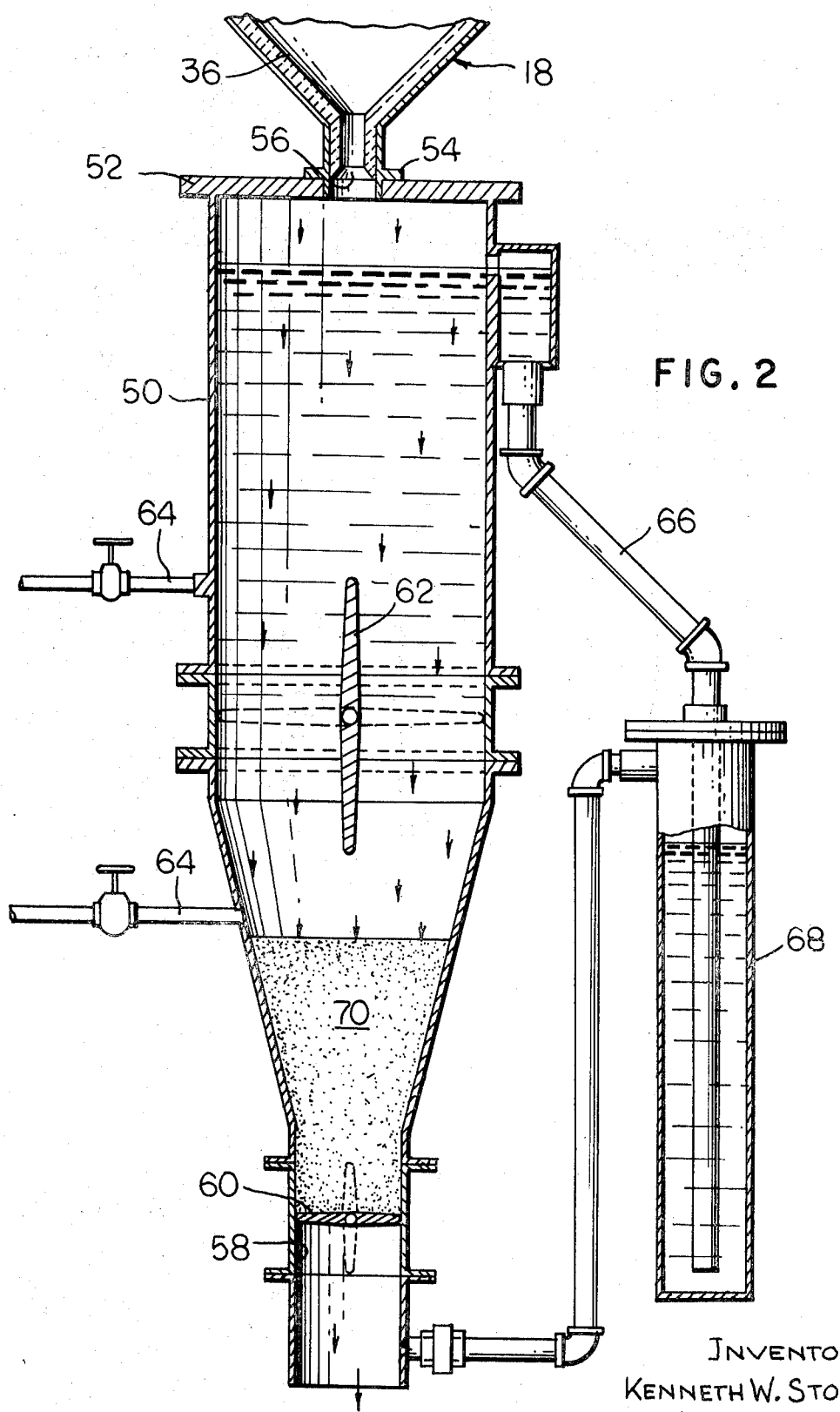
FIG. 2 is a vertical sectional view of a receiver for solid products of combustion and adapted for being connected to the bottom of the combustion chamber of FIG. 1.

Turning now to FIG. 2, the vessel for receiving the solid products of combustion from the bottom end of chamber 18 will be seen to comprise a vertical vessel 50 having a top plate 52 that is connected to the bottom flange 54 of the chamber 18. Passage 56 permits the solid products of combustion from chamber 18 to drop into the inside of vessel 50. At is extreme lower end vessel 50 has a discharge opening 58 from which the solid materials collected in the vessel can pass to a suitable receiver such as a conveyor belt or hopper, or the like. Discharge opening 58 has a valve 60 therein which can be turned to close the discharge opening or rotated at 90° to open the discharge opening to permit material to fall through the discharge opening.

In about the center of the vertical height of vessel 50 is a second valve member 62 which can be turned to its full line position to permit downward flow through the vessel, or to its dotted line position to close off the upper end of the vessel from the lower end.

A supply of water is maintained in vessel 50 as by the conduit means 64 and the upper end of the vessel is connected by conduit 66 with a water trap 68 so that the upper end of the vessel is sealed from the atmosphere and will not, thus, interfere with maintaining the pressure within chamber 18, whether the pressure be subatmospheric or superatmospheric at the bottom of the chamber.

In operation, valve 62 remains open while valve 60 remains closed until an accumulation of solid material, such as is indicated at 70 builds up in the bottom of the vessel. Thereupon, valve 62 is closed and valve 60 is opened and the solid material 70 is discharged from the bottom of the vessel. Thereafter, valve 60 is closed and the lower one of conduits 64 is availed of by opening the control valve therein, and the water charge is restored to the lower portion of vessel 50. Thereafter valve 62 can again be opened. At this time, the water level can be restored to the upper part of vessel 50 by availing of either of conduits 64. It will be appreciated that vessel 50 provides an arrangement for removing the solid products of combustion from chamber 18 while maintaining the lower end of chamber 18 sealed from the atmosphere at all times.

FIG. 3 shows a modification of the combustion chamber in which the conduit 80 leads from a furnace or other source of combustible gas to the upper end of a combustion chamber 82 which is venturi shaped in vertical cross section, with a throat region at 84. The subatmospheric pressure in the upper end of a combustion chamber 82 which is venturi shaped in vertical cross section, with a throat region at 84. The subatmospheric pressure in the upper end 86 of the combustion chamber 82 is maintained by a conduit 88 extending axially into the upper end of the venturi and operable to direct a high velocity jet of air into the throat of the venturi. A valve 90 in conduit 88 controls the rate of air flow therethrough. The conduit 92 for secondary air also opens into the upper end of chamber 82 and includes a control valve 90 for controlling the rate of air flow therethrough.

The igniters, or pilot means, for the mixture are indicated at 96 and are disposed downstream from the throat 84 of the venturi. The velocity of the jet of air is converted into a pressure head in the widening discharge entrance of the venturi so that the lower end 98 of the venturi operates at positive pressure as opposed to the subatmospheric pressure which is maintained in the lower end of the combustion chamber of FIG. 1. The upper end of chamber 82 is, of course, at subatmospheric pressure.

The gaseous product of combustion from the lower end of combustion chamber 82 are conveyed by conduit 100 to gas cooling and cleaning equipment and a fan may be included in this path if necessary, or if so desired. The lower end of combustion chamber 82 has a discharge opening 102 for the discharge of solid material from the combustion chamber and this discharge opening may be connected to the upper end of a receiver vessel such as is shown in FIG. 2, if so desired. Since combustion chamber 82 operates at a positive air pressure at the lower end, the solid material can be discharged therefrom without the use of a vessel, such as is shown in FIG. 2, which provides for an air lock. However, since the products of combustion are quite hot and it is not desired for hot gases to exit from the lower end of combustion chamber 82, it is preferable to employ a receiver somewhat of the type shown in FIG. 2 and which, as mentioned, provides a seal to prevent any substantial change in pressure in the lower end of chamber 82.

The combustion chamber of FIG. 2 is lined with a refractory material the same as the combustion chamber of FIG. 1, in order to withstand the high temperatures which prevail therein.

It is intended to comprehend such modifications and adaptations of the invention as fall within the scope of the appended claims.

I claim:

1. An apparatus for effecting complete and controlled combustion of combustible material, especially gases, comprising; a vertical cylindrical chamber having a refractory lining, first means for introducing the material to be burned near the top of the chamber for downflow therethrough during combustion, said first means being maintained under subatmospheric pressure, second means for withdrawing gaseous products of combustion near the lower end of said chamber, and third means at the bottom of said chamber for withdrawing solid products of combustion therefrom.

2. An apparatus according to claim 1, which includes air inlet means communicating with said chamber at the upper end thereof, and means for controlling the flow of air from said air inlet means into the upper end of said chamber.

3. An apparatus according to claim 2, which includes igniter means in said chamber for igniting said material following the point where said air inlet means is arranged to supply air to said material.

4. An apparatus according to claim 1, in which said first means comprises a conduit entering said chamber near the upper end of the chamber in a tangential direction so as to cause the material to impinge against the wall of the chamber.

5. An apparatus according to claim 2, in which said first means comprises a conduit entering said chamber near the upper end of the chamber in a tangential direction so as to cause the material to impinge against the wall of the chamber, and said air inlet means is connected to said conduit near the point where said conduit enters said chamber.

6. An apparatus according to Claim 5, in which said air inlet means supplies air to said conduit in a tangential direction to cause the air to mix with said material.

7. An apparatus according to claim 6, in which the velocity of the material and the air admixed therewith into said chamber is greater than the rate of flame propogation in the material whereby flameback into the conduit is prevented.

8. An apparatus according to claim 5, which includes a fuel supply conduit operable for supplying fuel to said material before the material enters said chamber, and means for controlling the flow of fuel through said fuel supply conduit.

9. An apparatus according to claim 1, in which said second means comprises a gas cooling means through which said gaseous products of combustion pass after leaving said chamber.

10. An apparatus according to claim 9, which includes a suction blower serially connected with said gas cooling means and operable for maintaining the lower end of said chamber at subatmospheric pressure.

11. An apparatus according to claim 10, in which said gas cooling means comprises a waste heat boiler.

12. An apparatus according to claim 9, which includes a gas cleaning means serially connected with said gas cooling means and discharging the cooled and cleaned gaseous products of combustion to the atmosphere.

13. An apparatus according to claim 1, in which said third means includes a closed vessel for solid products of combustion positioned beneath said chamber and sealingly communicating at the upper end thereof with the bottom of said chamber, and having a discharge opening at the lower end thereof.

14. An apparatus according to claim 13, in which said receiver comprises; a first valve in said vessel spaced from both the upper and lower ends thereof and operable for controlling vertical flow through said vessel, a second valve in said vessel controlling the said discharge opening thereof, and means for maintaining water in said vessel at a level above said first valve while sealing the upper end of the vessel from the atmosphere, said valves being individually operable for permitting the discharge of the solid products of combustion from the vessel while maintaining the upper end thereof sealed from the atmosphere.

15. An apparatus according to claim 3, in which said chamber is in the form of a venturi when viewed in vertical cross section, and conduit means in said chamber operable to discharge a jet of air axially into the throat of said venturi.

16. An apparatus according to claim 15, in which said igniter means are positioned downstream from the throat of said venturi.

17. An apparatus according to claim 15, which includes means for controlling the rate of air flow through said conduit means.

18. An apparatus according to claim 17, in which said air inlet means communicates with said chamber upstream of the discharge end of said conduit means.

19. A receiver for solid products of combustion for use with a combustion chamber having an opening at the bottom, said receiver comprising; a vessel adapted for sealingly communicating at the top with an opening in the bottom of the combustion chamber, said vessel being cylindrical and having its axis extending in the vertical direction, a first valve in said vessel spaced from both the upper and lower ends thereof and operable for controlling vertical flow through said vessel, a second valve in said vessel controlling the said discharge opening thereof, and means for maintaining water in said vessel at a level above said first valve while sealing the upper end of the vessel from the atmosphere, said valve being individually operable for permitting the discharge of the solid products of combustion from the vessel while maintaining the upper end thereof sealed from the atmosphere.